(12) United States Patent
DuPont, Jr. et al.

(10) Patent No.: US 11,143,336 B1
(45) Date of Patent: Oct. 12, 2021

(54) CONNECTOR, METHOD OF MAKING CONNECTOR AND TUBING ASSEMBLY METHOD

(71) Applicant: TBL PERFORMANCE PLASTICS, LLC, Sparta, NJ (US)

(72) Inventors: Paul Robert DuPont, Jr., Sparta, NJ (US); Christopher R. Ray, Newton, NJ (US); John A. Capra, Chester, NJ (US)

(\*) Notice: Subject to any disclaimer, the term of this patent is extended or adjusted under 35 U.S.C. 154(b) by 386 days.

(21) Appl. No.: 16/189,351

(22) Filed: Nov. 13, 2018

Related U.S. Application Data

(60) Provisional application No. 62/585,154, filed on Nov. 13, 2017.

(51) Int. Cl.
| | |
|---|---|
| F16L 47/02 | (2006.01) |
| F16L 13/02 | (2006.01) |
| F16L 41/02 | (2006.01) |
| B29C 65/02 | (2006.01) |
| F16L 21/00 | (2006.01) |
| B29L 31/24 | (2006.01) |
| B29K 623/00 | (2006.01) |

(52) U.S. Cl.
CPC ............. *F16L 13/02* (2013.01); *B29C 65/02* (2013.01); *F16L 21/00* (2013.01); *F16L 41/021* (2013.01); *F16L 47/02* (2013.01); *B29K 2623/12* (2013.01); *B29L 2031/24* (2013.01)

(58) Field of Classification Search
CPC . F16L 47/02; F16L 47/03; F16L 23/22; F16L 23/04; F16L 23/08; F16L 23/10; F16L 23/12; F16L 23/162; F16L 23/165; B29C 65/02; B29C 66/53241; B29C 66/53423; B29C 66/53425

USPC ............... 285/3, 4, 367, 21.2; 137/68.12, 76
See application file for complete search history.

(56) References Cited

U.S. PATENT DOCUMENTS

| | | | | |
|---|---|---|---|---|
| 3,806,386 A | * | 4/1974 | Burke et al. ............ | B29C 65/08 156/73.1 |
| 4,019,512 A | * | 4/1977 | Tenczar ................ | A61M 39/14 604/411 |
| 4,030,494 A | * | 6/1977 | Tenczar ................ | A61M 39/14 604/411 |
| 4,157,723 A | * | 6/1979 | Granzow .............. | B29C 66/857 141/1 |
| 4,187,846 A | * | 2/1980 | Lolachi ................. | A61M 39/18 604/411 |
| 4,265,280 A | * | 5/1981 | Ammann .......... | B29C 66/52298 141/98 |
| 4,325,417 A | * | 4/1982 | Boggs ....................... | A61L 2/08 141/98 |
| 5,117,875 A | * | 6/1992 | Marrucchi .......... | B01F 15/0205 141/1 |
| 5,605,360 A | * | 2/1997 | Kurisaki ............. | G01L 19/0007 285/93 |
| 5,643,227 A | * | 7/1997 | Stevens ............. | A61M 39/0606 604/167.02 |
| 6,874,522 B2 | * | 4/2005 | Anderson ................ | A61J 1/10 137/68.3 |

(Continued)

*Primary Examiner* — David Bochna
(74) *Attorney, Agent, or Firm* — R. Neil Sudol

(57) ABSTRACT

A fitting or connector for use in constructing a tubing assembly is made by bonding an olefin gasket to an end face of a polypropylene fitting member. The gasket is bonded to the fitting member via a heat fusion technique that causes localized melting together of the gasket and the fitting and generates a composite fitting or connector.

10 Claims, 8 Drawing Sheets

(56) References Cited

U.S. PATENT DOCUMENTS

| | | | | |
|---|---|---|---|---|
| 7,097,209 | B2* | 8/2006 | Sparrman | A61M 39/14 |
| | | | | 285/3 |
| 7,578,530 | B2* | 8/2009 | Eriksson | F16L 23/10 |
| | | | | 285/367 |
| 8,196,971 | B2* | 6/2012 | Hansen | F16L 23/10 |
| | | | | 285/367 |
| 8,448,992 | B2* | 5/2013 | Min | A61M 39/143 |
| | | | | 285/3 |
| 10,794,524 | B2* | 10/2020 | Bunn, Sr. | F16L 47/14 |
| 2001/0022448 | A1* | 9/2001 | Matsuzawa | F16L 23/08 |
| | | | | 285/367 |
| 2007/0045968 | A1* | 3/2007 | Long | B29C 45/14344 |
| | | | | 277/608 |
| 2007/0106264 | A1* | 5/2007 | Proulx | A61M 39/16 |
| | | | | 604/533 |
| 2008/0245154 | A1* | 10/2008 | Sekine | G01L 9/0073 |
| | | | | 73/724 |
| 2008/0265561 | A1* | 10/2008 | Buchanan | B29C 65/7473 |
| | | | | 285/21.1 |
| 2009/0068032 | A1* | 3/2009 | Furey | F04B 43/025 |
| | | | | 417/395 |
| 2009/0119886 | A1* | 5/2009 | Werth | F16L 47/14 |
| | | | | 24/193 |
| 2011/0148096 | A1* | 6/2011 | Engle | G01K 1/14 |
| | | | | 285/93 |
| 2016/0053925 | A1* | 2/2016 | Dohi | F16L 21/03 |
| | | | | 285/337 |
| 2019/0009479 | A1* | 1/2019 | DuPont, Jr. | B29C 66/52241 |

* cited by examiner

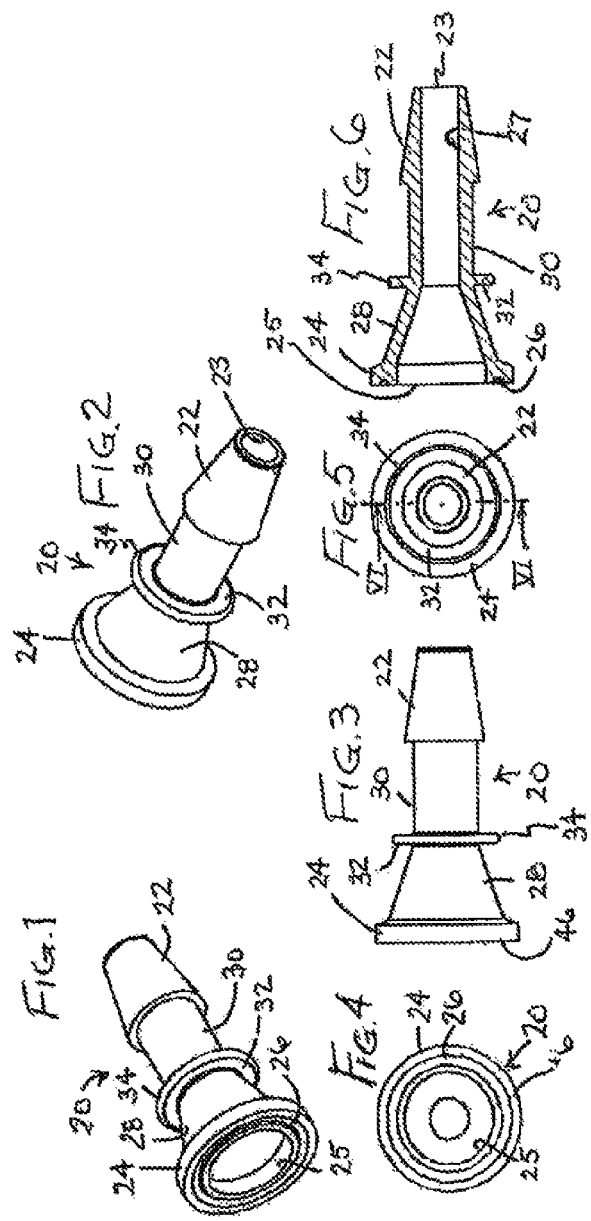

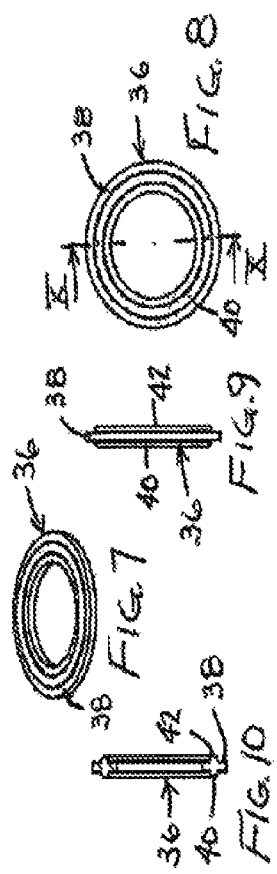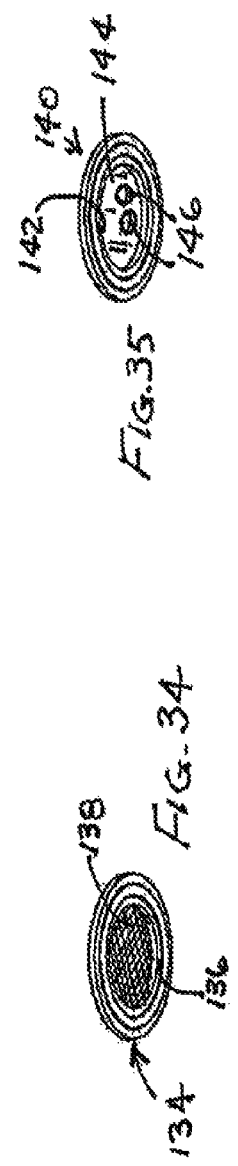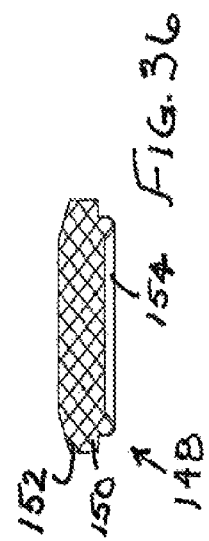

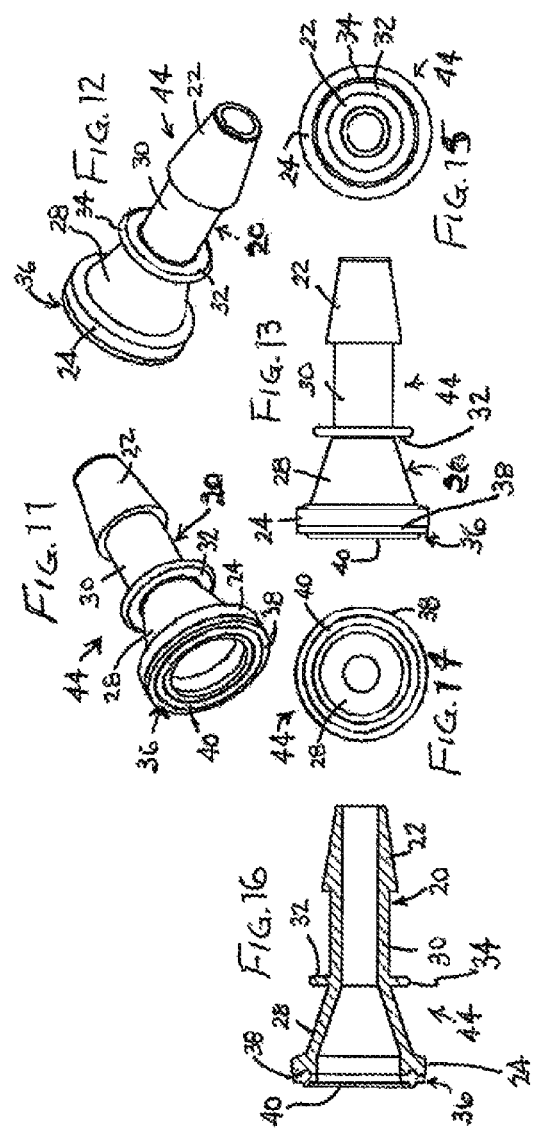

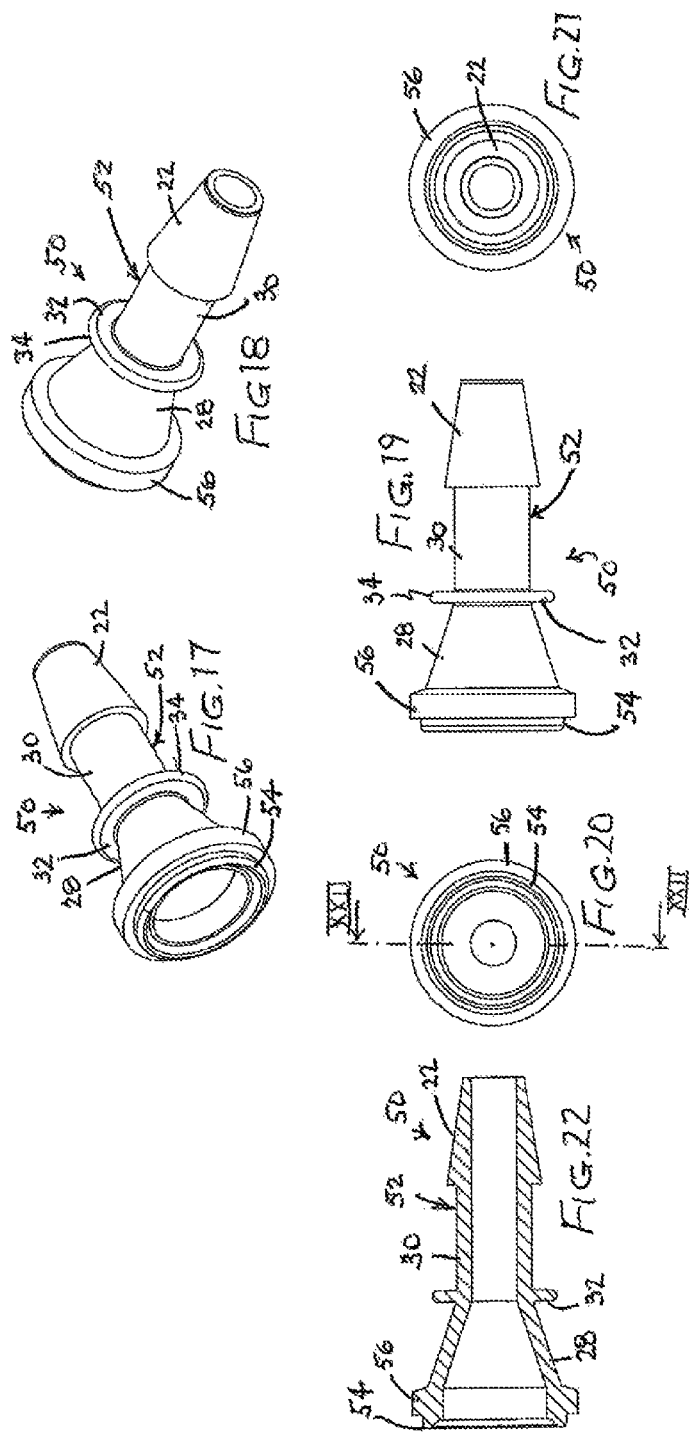

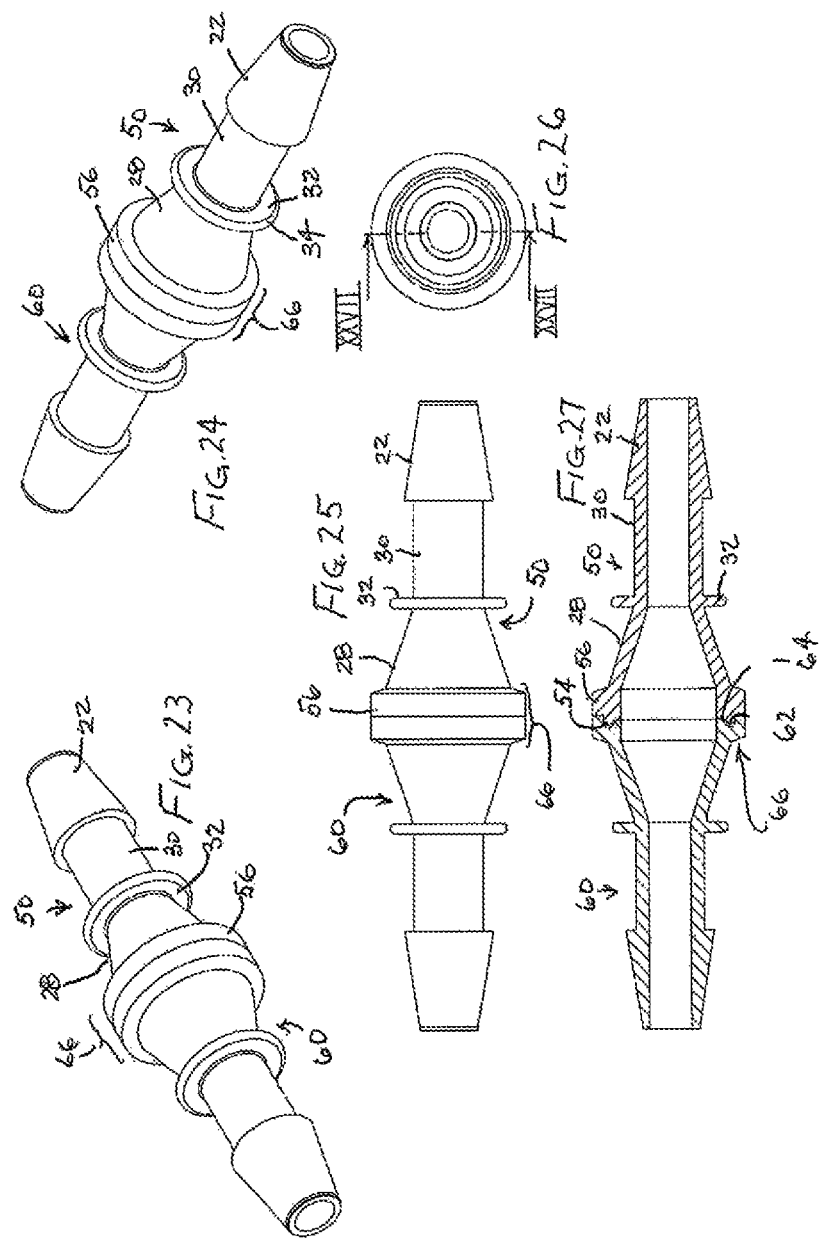

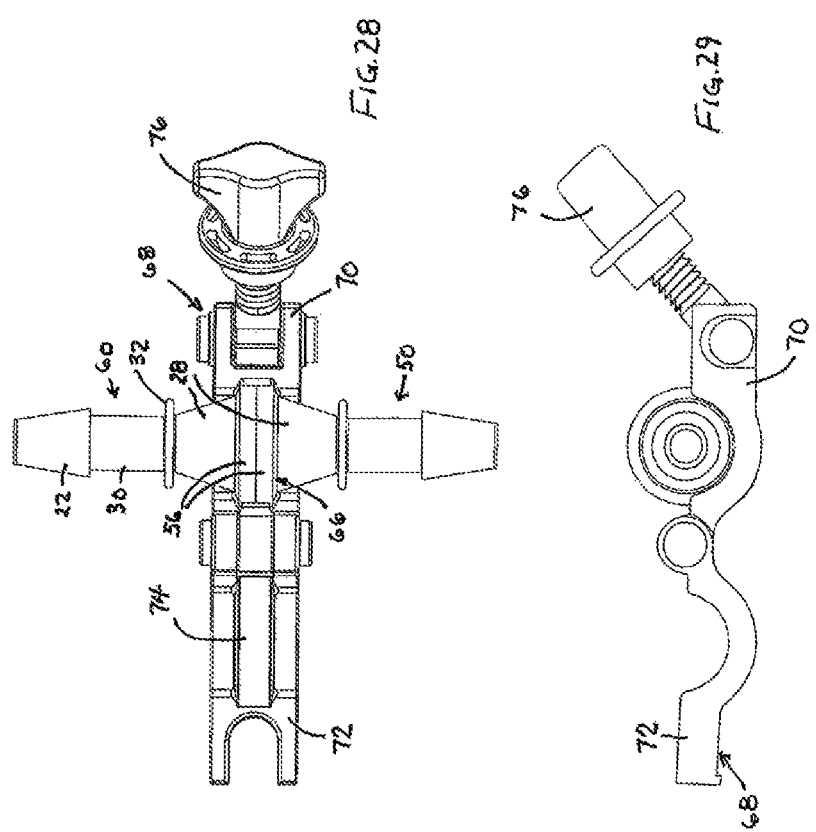

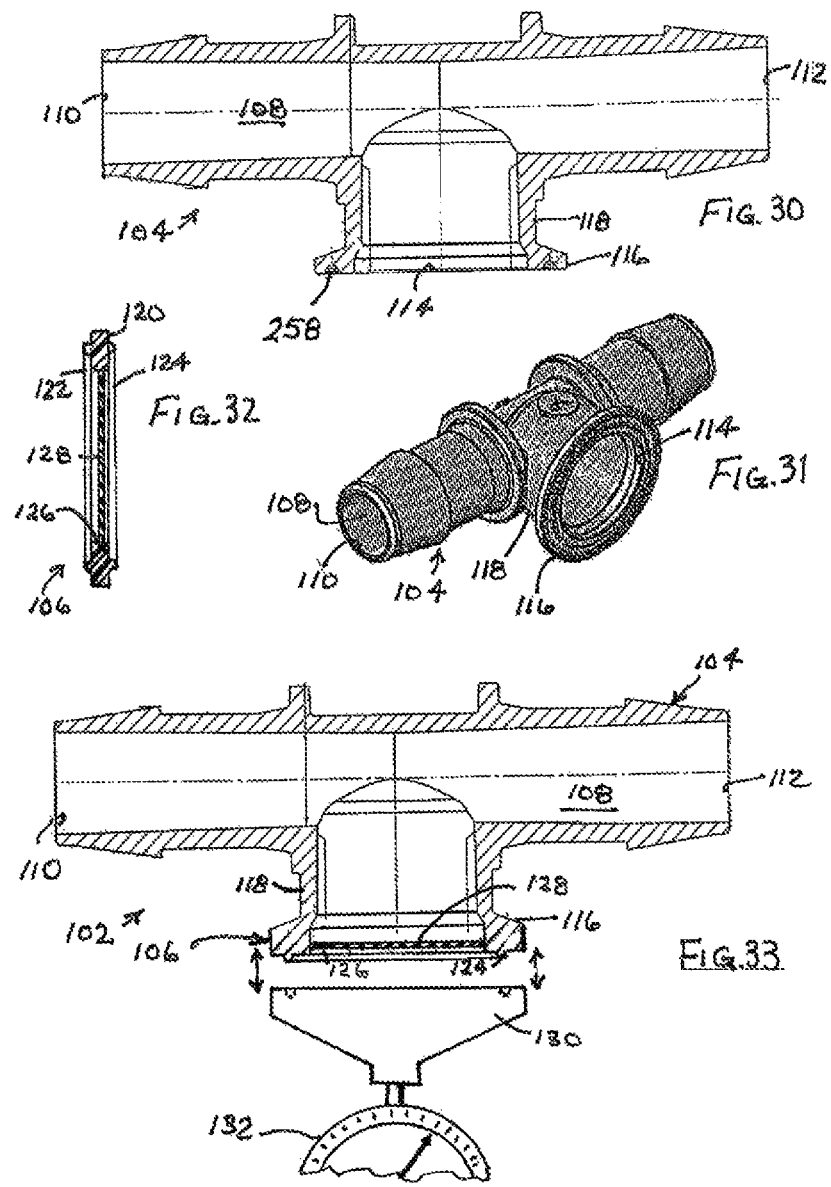

CONNECTOR, METHOD OF MAKING CONNECTOR AND TUBING ASSEMBLY METHOD

CROSS-REFERENCE TO RELATED APPLICATION

This application claims the benefit of U.S. Provisional Patent Application No. 62/585,154 filed Nov. 13, 2017, the entire disclosure of which is hereby incorporated by reference.

FIELD OF THE INVENTION

The invention relates to tubing systems used to transport fluidic materials in the manufacture, for instance, of pharmaceuticals and medicaments. More particularly, this invention relates to a fitting or connector used to couple tubing sections to form a fluid transport circuit. This invention also relates to a method for manufacturing the fitting or connector. This invention further relates to associated methods of constructing tubing systems.

BACKGROUND OF THE INVENTION

For as long as drug products have been manufactured, the Biotech and Pharmaceutical industry used various methods to convey liquid products during the drug manufacturing process. In more recent years the industry's mindset has been to move away from traditional processes which relied on fixed capital intensive piping systems. Traditional systems are typically made from stainless steel or glass lined piping. Because these systems were capital intensive, drug manufacturers would go to large expense to validate cleanability and ensure no cross contamination from one batch to the next. Facility owners have had to invest in expensive large and sophisticated utility plants with chemical dosing systems and ultra-high purity steam systems necessary to sterilize the systems.

More recently manufacturing methods have trended to faster drug development and faster regulatory clearance to market. This trend is in conjunction with, and partially due to, world health authorities granting fast track approvals of vaccines and therapies to combat the new strains of mutated diseases, which are arising more frequently.

Today, many of the new drug manufacturing processes utilize "Single Use Systems". These are basically pre-sterilized sub-systems manufactured from plastics. They are used once, or a limited number of times, and then discarded. For example, instead of a stainless steel vessel and piping, a typical single use system would consist of a number of plastic bag(s) connected by a series of plastic tubing sets with mechanical connection means, including tubing manifolds, between bags, tubes and other system components. Concern over the seal integrity on tubing manifolds is of paramount concern. Manifolds are constructed using fittings to connect multiple incoming and outgoing tubing lengths in various configurations.

Because of their high temperature rating, Stainless Steel Piping Systems are typically sanitized by methods of hot water or "Steam in Place" (SIP). Plastic systems are typically sterilized by different methods and components are replaced more frequently, thereby reducing potential contamination from incomplete cleaning of the system between batches.

Single use plastics offer many other advantages. Components may cost less and can be manufactured in desired shapes by a multitude of manufacturing methods, including molding. In biopharmaceutical processing systems, plastics are typically sterilized by means of Gamma or electron-beam irradiation, or Autoclave.

There is a need in the industry for systems, components and methods that help avoid system contamination while minimizing build cost, build time, cleaning cost, system defects and environmental impact.

The typical end configuration used to join devices and tube ends is the "sanitary," also known as the "tri-clamp," design, which uses a face-seal gasket between two mating components. The gasket and fittings are separate components. Until the installation is complete, the faces of the fittings and gaskets are vulnerable to outside contamination. Installation of the gasket requires handling that also increases risk of contamination.

In addition, low-profile, translucent gaskets can be difficult to see, particularly in a clean-room environment where operators wear gowns, gloves and sometimes eye protection. Missing gaskets can go unnoticed.

Gaskets and fitting face designs have not been fully standardized in the industry. The degree of standardization of plastic components lags behind that of stainless steel products. For this reason users currently must take care in selecting and testing combinations of system components, fittings and gaskets. Sealing performance may vary depending on fitting manufacturer and gasket manufacturer. Small changes in a component can lead to system problems or require re-validation.

OBJECTS OF THE INVENTION

It is an object of the present invention to provide an improved fitting for connecting lengths of tubing in a fluid flow system used in the manufacture of pharmaceuticals and medicaments.

It is a related object of the present invention to provide an improved method for connecting lengths of tubing in a fluid flow system used in the manufacture of pharmaceuticals and medicaments.

An associated object of the present invention is to provide an improved method for manufacturing a fitting for connecting lengths of tubing in a fluid flow system used in the manufacture of pharmaceuticals and medicaments.

Another object of the present invention is to provide such a fitting and such methods that help avoid system contamination while minimizing build cost, build time, cleaning cost, system defects and environmental impact.

SUMMARY OF THE INVENTION

The present invention is directed in part to a method of manufacturing a fitting or connector for use in constructing a tubing assembly. The method comprises providing a fitting member including a plurality of ends with respective openings that communicate with one another via a lumen of the connector member, one of the ends being formed with an end face. The method further comprises providing a gasket, disposing the gasket against the end face, and bonding the gasket to the end face of the fitting member to form a fluid-tight seal between the gasket and the end face of the fitting member.

Pursuant to a feature of the present invention, the bonding of the gasket to the end face of the fitting member includes applying energy to at least one of the gasket and the fitting member to sealingly fuse the gasket to the end face. In particular, the applying of energy includes elevating a temperature of the gasket and/or the fitting member to heat fuse the gasket to the end face of the fitting member.

Preferably, the gasket is made of a first polymeric material and the fitting member is made of a second polymeric material different from the first polymeric material. The first polymeric material is typically more flexible and deformable that the second polymeric material. The applying of energy to the gasket and/or the fitting member preferentially includes an applying of heat energy in an amount to induce a microscopic or molecular-level mixing of the first polymeric material with the second polymeric material at an interface between the end face of the fitting and the gasket to produce a density or concentration gradient of the first polymeric material and an oppositely directed density or concentration gradient of the second polymeric material between the gasket and the fitting member. In brief, the gasket is bonded to the fitting member via a heat fusion technique that causes localized melting together of the gasket and the fitting and generates a composite fitting or connector. In the composite fitting or connector, the gasket face of the fitting member is soft and pliable and that material gradually merges with the more rigid material of the fitting member. The fitting member becomes a unitary object with different part of the unitary object having different physical characteristics.

In a preferred embodiment of the present invention, wherein the end of the fitting member face is provided with a recess and the gasket includes a pair of major surfaces, one of the major surfaces including a projection, the disposing of the gasket against the fitting end face includes disposing the projection in the recess. The mating projection and recess serve to facilitate alignment and registration of the gasket with the end face of the fitting member prior to and during the bonding process. (The mating features may be dispensed with where ancillary external support and fixation devices are used to ensure mutual alignment and registration of the gasket and the fitting member.) The mixing of polymeric material and concomitant gradient generation can effectuate an obliteration of the structural idiosyncrasies of the gasket and the fitting member at the interface therebetween. In particular, any projection on the gasket and an associated receptive recess on the fitting member end face may disappear.

A fitting or connector for use in constructing a tubing assembly comprises, in accordance with the present invention, a fitting member including a plurality of ends with respective openings that communicate with one another via a lumen of the connector member. The fitting member is provided at one of the ends with a gasket bonded to the fitting member so as to form a fluid-tight seal between material of the gasket and material of the fitting member. Where the gasket is made of a first polymeric material and the fitting member is made of a second polymeric material different from the first polymeric material, the gasket is preferably fused to the fitting member so that it is impossible to detect where the fitting member ends and the gasket begins. The first polymeric material is mixed with the second polymeric material at an interface between the fitting member and the gasket to produce a density or concentration gradient of the first polymeric material and an oppositely directed density or concentration gradient of the second polymeric material between the gasket and the fitting member.

Pursuant to a preferred feature of the present invention, the first polymeric material is olefin and the second polymeric material is polypropylene.

It is a preferred, but not required, feature of the present invention that the gasket includes a major surface on a side opposite the fitting, with that major surface including a projection. It is a more particular feature of the present invention that the projection is an annular rib or bead which is receivable in an annular groove in an additional fitting member. The two fitting members cooperate to form a joint in a hydraulic or fluid-conveyance circuit.

The gasket is preferably heat fused to the fitting member.

In accordance with another feature of the present invention, the fitting member or preform is a T fitting having two end openings defining a flow-through pathway and a third end opening laterally of said flow-through pathway. The gasket is attached at the end of the fitting member or preform which has the third end opening. The gasket includes a fluid-impermeable diaphragm at least coextensive with a central opening of the gasket, whereby the gasket provides a seal and impediment to fluid flow. The T composite fitting or connector is preferably used for attachment of a gauge or measurement device to a tubing assembly.

In accordance with another feature of the present invention, the gasket includes a web member at least coextensive with a central opening of the gasket, where the web member is a diaphragm, a screen, or a perforated plate.

A method of constructing a connector and tubing assembly comprises, in accordance with the present invention, providing a first fitting or connector member including a plurality of ends with respective openings that communicate with one another through a lumen of the first fitting or connector member, the first fitting or connector member being provided at one of the ends with a gasket bonded to the first fitting or connector member so as to form a fluid-tight seal between material of the gasket and material of the fitting or connector member. The method further comprises providing a second fitting or connector member including a plurality of ends with respective openings that communicate with one another through a lumen of the second fitting or connector member, the second fitting or connector member having an end face. The method also comprises juxtaposing the first fitting or connector member and the second fitting or connector member so that the end face (of the second fitting or connector member) is in contact with the gasket (bonded to the first fitting or connector member), and coupling the first fitting or connector member and the second fitting or connector member to one another to form a fluid tight seal between the end face and the gasket.

Where the gasket is made of a first polymeric material and the first fitting or connector member is made of a second polymeric material different from the first polymeric material, the gasket is preferably heat fused to the first fitting or connector member. In that case, the first polymeric material is mixed with the second polymeric material at an interface between the first fitting or connector member and the gasket to produce a density or concentration gradient of the first polymeric material and an oppositely directed density or concentration gradient of the second polymeric material between the gasket and the first fitting or connector member.

Pursuant to a preferred feature of the present invention, the coupling of the first fitting or connector member and the second fitting or connector member to one another is implemented by placing a clamp about juxtaposed ends of the first fitting or connector member and the second fitting or connector member and locking the clamping about the juxtaposed ends of the first fitting or connector member and the second fitting or connector member.

A preferred embodiment of the present invention is, accordingly, a polypropylene fitting and thermoplastic olefin gasket with fitting end geometry and gasket geometry, before fusion, essentially matching, or very similar to, common sanitary "tri-clamp" characteristics, such as ASME BPE standard configuration for steel fittings with gaskets.

A method for use in constructing a connector and tubing assembly comprises, in accordance with the present invention, providing a T-type fitting or connector member having two end openings defining a flow-through pathway and a third end opening lateral to the flow-through pathway. The fitting or connector member is provided at the third end opening with a gasket bonded to the fitting or connector member so as to form a fluid-tight seal between material of the gasket and material of the fitting or connector member. The gasket includes a fluid-impermeable diaphragm at least coextensive with a central opening of the gasket, whereby the gasket provides a seal and impediment to fluid flow. The method further comprises juxtaposing an access port of a gauge or measurement device with the gasket bonded to the fitting or connector member and removably coupling the gauge or measurement device to the fitting or connector member to form a fluid tight seal between the gauge or measurement device and the gasket.

A tubing assembly component, for use in assembling a tubing circuit, comprises, in accordance with the present invention, a fitting member such as (a) a tubular member with two or more ports or (b) an end cap for use in closing off an unused port, where the fitting member is made of hard polymeric material such as polypropylene and is provided with a gasket made of a different, soft and pliable polymeric material such as olefin, with the gasket bonded to the fitting member so as to form a fluid-tight seal between material of the gasket and material of the fitting member.

In summary, the present invention is directed to an elastomer gasket heat-fused to a rigid polymer fitting. Fusing the two components eliminates two exposed faces and the corresponding sealing interface. This integration of the gasket into the fitting member, forming a gasket-fitting composite substantially reduces risk of contamination in handling and of leakage in use. There is no handling of a separate gasket. Installation is simplified. Risk of connections missing gaskets is eliminated. Performance risks related to selection and variation of mating components are eliminated for that interface. Where the gasket has an impermeable membrane or diaphragm and is used at a gauge or device coupling point, the degree of cleanliness of the gauge is no longer crucial, as the gauge does not come into contact with the sterile interior surfaces of the tubing and fittings.

Because the gasket is fused, it cannot separate in shipping or preparation. It is impossible to install a fitting with no gasket.

An instrument fitting pursuant to the present invention was developed as a means to maintain a sterile barrier where disposable manifolds are used on hybrid single-use process equipment. Fixed or tethered pressure-monitoring devices provide extremely high accuracy and are often hard wired into a central control panel. The present instrument fitting provides a practical means of maintaining a sterile barrier on a complex manifold set, and ensures a barrier without the need to have a gauge present during the sterilization process.

A fitting in accordance with the present invention incorporates an elastomeric, e.g., TPE (Cellgyn™), gasket fused into a singular sanitary fitting, forming a one-piece composite design. The result is a gendered fitting that can be used in conjunction with any standard sanitary connection. It provides superior ergonomics and less risk of contamination.

A composite fitting or connector in accordance with the present invention is formed without the use or application of solvents, glues or adhesives. A composite fitting or connector in accordance with the present invention may provide gendered connection that works with any non-gendered sanitary connection.

The present invention fulfills a long-standing need in the industry—as evidenced by the problems solved by the invention. No manufacturer offers a sanitary fitting with an elastomeric gasket permanently affixed to its face. At least one manufacturer offers plastic sanitary fittings with mechanically affixed gaskets of dissimilar materials. One such existing design comprises a gasket with special features that mechanically attach to special tabs on a fitting. This design has the disadvantage that the gasket can separate from the fitting during shipping, handling or installation, exposing the two mating faces to potential contamination. This may lead to a false sense that the gasket will always be attached.

BRIEF DESCRIPTION OF THE DRAWINGS

FIG. 1 is a front, left side and top perspective view of a fitting member used in constructing a fitting or connector in accordance with the present invention.

FIG. 2 is a rear, left side and top perspective view of the fitting member of FIG. 1.

FIG. 3 is a side elevational view of the fitting member of FIGS. 1 and 2.

FIG. 4 is a front elevational view of the fitting member of FIGS. 1-3.

FIG. 5 is a rear elevational view of the fitting member of FIGS. 1-4.

FIG. 6 is a longitudinal cross-sectional view of the fitting member of FIGS. 1-5, taken along line VI-VI in FIG. 5.

FIG. 7 is a top perspective view of a gasket or sealing ring used in constructing a fitting or connector in accordance with the present invention.

FIG. 8 is a front elevational view of the gasket or sealing ring of FIG. 7.

FIG. 9 is a side elevational view of the gasket or sealing ring of FIGS. 7 and 8.

FIG. 10 is a cross-sectional view of the gasket or sealing ring of FIGS. 7-9, taken along line X-X in FIG. 8.

FIG. 11 is a front, left side and top perspective view of a fitting or connector in accordance with the present invention, assembled from the fitting member of FIGS. 1-6 and the gasket or sealing ring of FIGS. 7-10, that also represents a preliminary stage in manufacturing a connector or composite fitting member in accordance with the invention.

FIG. 12 is a rear, left side and top perspective view of the fitting member of FIG. 11.

FIG. 13 is a side elevational view of the fitting member of FIGS. 11 and 12.

FIG. 14 is a front elevational view of the fitting member of FIGS. 11-13.

FIG. 15 is a rear elevational view of the fitting member of FIGS. 11-14.

FIG. 16 is a longitudinal cross-sectional view of the fitting member of FIGS. 11-15, taken along line XVI-XVI in FIG. 15.

FIG. 17 is a front, left side and top perspective view of a fitting or connector in accordance with the present invention, a modification of the embodiment of FIGS. 11-16.

FIG. 18 is a rear, left side and top perspective view of the fitting or connector of FIG. 17.

FIG. 19 is a side elevational view of the fitting or connector of FIGS. 17 and 18.

FIG. 20 is a front elevational view of the fitting or connector of FIGS. 17-19.

FIG. 21 is a rear elevational view of the fitting or connector of FIGS. 17-20.

FIG. 22 is a longitudinal cross-sectional view of the fitting or connector of FIGS. 17-21, taken along line XXII-XXII in FIG. 20.

FIG. 23 is a front, left side and top perspective view of a pair of juxtaposed fittings or connectors including the fitting or connector of FIGS. 17-22, aligned with one another for forming a joint in a fluid-flow tubing system.

FIG. 24 is a rear, left side and top perspective view of the juxtaposed fittings or connectors of FIG. 23.

FIG. 25 is a side elevational view of the juxtaposed fittings or connectors of FIGS. 23 and 24.

FIG. 26 is a front elevational view of the juxtaposed fittings or connectors of FIGS. 23-25.

FIG. 27 is a longitudinal cross-sectional view of the juxtaposed fittings or connectors of FIGS. 23-26, taken along line XXVII-XXVII in FIG. 26.

FIG. 28 is an elevational plan view of juxtaposed fittings or connectors in accordance with the present invention, with adjacent and aligned flanges disposed in a recess in an opened tubing clamp.

FIG. 29 is a side elevational view of the juxtaposed fittings or connectors and open tubing clamp of FIG. 28.

FIG. 30 is a longitudinal cross-sectional view of a T fitting member or preform, similar to the views of FIGS. 6, 16, 22, and 27, for attachment or installation of a gauge or measurement device to a tubing assembly.

FIG. 31 is a perspective view of the T fitting member or preform of FIG. 30.

FIG. 32 is a transverse cross-sectional view, similar to FIG. 10, of a gasket which is permanently attachable to the fitting member of FIGS. 30 and 31 pursuant to the present invention, where the gasket includes a liquid-impermeable diaphragm.

FIG. 33 is an exploded view of a gauge or measurement device and a composite fitting or connector manufactured from the fitting member of FIGS. 30 and 31 and the gasket of FIG. 32.

FIG. 34 is a perspective view of a gasket provided in a central opening with a filter screen, which gasket may be incorporated into a composite fitting or connector in accordance with the present invention.

FIG. 35 is a perspective view of a gasket provided in a central opening with a thin perforated plate, which gasket may be incorporated into a composite fitting or connector in accordance with the present invention.

FIG. 36 is cross-sectional views of a circular end cap that may be attached over an unused port in a tubing system, the end cap including a fused and integral gasket pursuant to the present invention.

DETAILED DESCRIPTION

Figure 37:
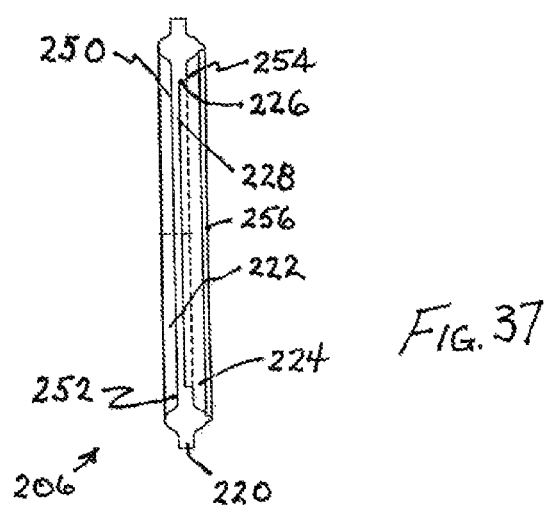
FIG. 37 is a transverse cross-sectional view, similar to FIG. 32, showing a modified gasket which is permanently attachable to the fitting member of FIGS. 30 and 31 pursuant to the present invention, where the gasket includes a liquid-impermeable diaphragm.

As illustrated in FIGS. 1-6, a fitting member 20 for use in formed or assembling fluid flow conduits for particular, although not exclusive, use in the manufacture of medicaments consists of an injection molded body member of a relatively stiff and form-maintaining polymeric material such as polypropylene. Body member 20 is provided at one end with a conical formation 22 and at an opposite end with a circumferential flange 24. Flange 24 is formed on an outer surface, facing in a direction opposite conical formation 22, with an annular groove 26 and is integral on an opposite side with a conical portion 28 that in turn is integral with conical formation 22 via a cylindrical segment 30. A second circumferential flange 32 may be provided, for instance, at the junction or intersection of conical portion 28 and cylindrical segment 30. Flange 32 has a beveled or rounded circular outer perimeter 34.

Conical end formation 22 and flange 24 define respective openings 23 and 25 that communicate with one another via a lumen 27 of the fitting member.

As depicted in FIGS. 7-10, a gasket or O-ring sealing element 36, which is preferably made of a flexible or deformable polymeric material such as olefin, comprises a planar base member 38 formed on opposing major faces (not designated) with a pair of annular ribs or beads 40 and 42. Ribs or beads 40 and 42 are typically of the same size and profile but may be provided with differing sizes and shapes, as well as locations relative to base member 38. Ribs or beads are shown as centrally located. However either one or the other may be of larger or smaller diameter and disposed exemplarily along a circular outer edge or circular inner edge of base member 38.

As shown in FIGS. 11-16, a composite fitting or connector 44 comprises gasket or O-ring 36 disposed along an outer annular surface or end face 46 of flange 24, with one of the annular beads or ribs 40 and 42 seated inside groove 26. Gasket or O-ring 36 is bonded to the end face 46 of fitting member 20 to form a fluid-tight seal between the gasket and the end face of the fitting member. The bonding of gasket or O-ring 36 to annular surface or end face 46 of fitting member 20 may include applying energy to gasket 36 and/or fitting member 20 to sealingly fuse the gasket to the fitting end face. In particular, the applying of energy includes elevating a temperature of at least one of the gasket and the fitting member to heat fuse the gasket 36 to the end face 46.

FIGS. 17-22 show an embodiment of a composite fitting or connector 50 having a main body 52 made of a hard or stiff polymeric material such as polypropylene and an annular bead or rib 54 projecting from a flange 56 at one end of the fitting or connector. Bead or rib 54 is made of a flexible, resilient and deformable material such as olefin.

Fitting or connector 50 is made by a process as described hereinabove with reference to FIGS. 11-16. More particularly, in the process for manufacturing composite fitting or connector 50 heat is applied in such an amount or intensity that a reformation or fusing occurs between a gasket preform (not separately visible in FIGS. 17-22 owing to a heat-induced reformation of the component parts) and a fitting preform, namely, main body 52. The applying of energy to at least one of the gasket preform (which similar to, but includes some geometric modification of, gasket or O-ring 36) and the main-body fitting member 52 preferentially includes an applying of heat energy in an amount to induce a microscopic or molecular-level mixing of the olefin material of the gasket with the polypropylene material of the main-body fitting member 52 at an interface between an end face (see end face 46) of the main body 52 and the gasket to produce a density or concentration gradient of the olefin polymer and an oppositely directed density or concentration gradient of the polypropylene between the gasket preform and the main body 52. In an intermediate plane the densities or concentrations of the olefin polymer and the polypropylene are substantially equal on average. From a macroscopic observational point of view, the gasket loses its separate identity and merges with or becomes a feature of the main body 52 or fitting. The composite fitting or connector 50 is a hard or stiff member provided with a soft or deformable bead or rib 54, as well as resilient outwardly projecting annular flange 56, which is soft and pliable on the end face carrying the fused gasket.

Main body 52 of fitting or connector 50 has the same structure as fitting member 20 described above with reference to FIGS. 1-6. Like reference numerals are used to designate like parts.

FIGS. 23-27 depict composite fitting or connector 50 in juxtaposition to and linearly aligned with a second fitting member 60, with annular bead or rib 54 seated in an annular groove 62 on an end face 64 of the second fitting member. This second fitting 60 is made of a stiff polymeric material (e.g., polypropylene) throughout. A liquid-tight seal is formed between fittings or connectors 50 and 60 owing to the incorporation of a gasket or sealing ring, including bead 54, into the structure of fitting or connector 50.

Fitting or connector 60 has the same basic structure as fitting member 20 described above with reference to FIGS. 1-6. Like reference numerals are used to designate like parts. In their juxtaposition, fittings or connectors 50 and 60 form a central flange 66 which is received in an annular recess of a hinged clamp 68 shown in FIG. 28. Clamp 68 includes two generally C-shaped halves 70 and 72 each with a C-shaped recess 74 (only one shown) in which the composite central flange 66 is seated. Upon a pivoting closure of clamp halves 70 and 72 and a tightening of a locking wing nut 76, clamp 68 serving in part to press the two fittings or connectors 50 and 60 together and induce the gasket end of fitting 50 to deform against the end face 64 of fitting 60 to create a better seal.

As illustrated in FIGS. 30-33, a composite fitting or connector 102 (FIG. 33) for use in assembling a fluid flow circuit exemplarily in the manufacture of medicaments and pharmaceutical compositions comprising a fitting member or preform 104 (FIGS. 30 and 31) of a hard polymeric material such as polypropylene and a gasket preform member 106 (FIG. 32) of a soft pliable polymeric material such as olefin, bonded and preferably heat fused to one another so that the material of the gasket 106 mixes with the material of the fitting member 104 along an interface between the two elements, as described hereinabove.

Fitting member 104 is a T fitting defining a linear flow-through pathway or lumen segment 108 extending between two openings 110 and 112 at opposite ends. The fitting member includes a third opening 114 at an end 116 of a lateral branch or stem 118 of the T fitting, which defines an ancillary lumen or tributary liquid channel lateral to the flow-through pathway 108.

Gasket 106 comprises an annular body or ring 120 provided on opposing lateral faces (not designated) with annular beads or ribs 122 and 124. Disposed within a center opening 126 of gasket 106 and coextensive with the opening is a diaphragm 128 in the form of a web of impermeable polymeric material bonded around its periphery to body or ring 120. Preferably, diaphragm 128 is disposed to one side of gasket 106, substantially coplanar with one of the two opposing lateral faces or major surfaces. This offset of diaphragm 128 from a center plane of the gasket ensures a positive marriage between the diaphragm and a sanitary gauge. The offset eliminates a gap or space that becomes filled with air. Air being compressible hinders or reduces gauge accuracy. In addition, a greater force is required to move the diaphragm. At low pressures, a centered diaphragm would prevent the gauge from reading anything at all.

Gasket 106 is heat fused to fitting member 104 so as to form a fluid-tight seal between material of the gasket and material of the fitting member. In a tubing circuit assembled to include composite fitting or connector 102, one juxtaposes an access port 130 of a gauge or measurement device 132 with the gasket 106 bonded to fitting member 104 and removably couples the gauge or measurement device 132 to composite fitting or connector 102 to form a fluid tight seal between access port 130 of the gauge or measurement device and the gasket 106. It is not necessary to assiduously sterilize or clean the gauge or measurement device prior to attachment thereof to fitting or connector 102 as sterility of the fluid flow system will be maintained by the integrated diaphragm 128.

FIG. 34 depicts a gasket 134 provided in a central opening 136 with a filter screen 138. FIG. 35 shows a gasket 140 provided in a central opening 142 with a thin plate 144 provided with one or more perforations 146. Gasket 134 or 140 may be incorporated into a composite fitting or connector by heat fusing as described hereinabove.

FIG. 36 depicts a circular end cap 148 that may be attached over an unused port in a tubing system. End cap 149 including a gasket portion 150 of soft polymeric material (e.g., olefin) heat fused and integrated with a body member portion 152 of hard polymeric material (e.g., polypropylene) as described above. A projection such as an annular rib or bead 154 may be included as an integral part of gasket portion 150 and concomitantly of end cap 148. End cap 148 may be used to close off unused ports in an assembled tubing system.

FIG. 37 illustrates a modified gasket preform member 206 of a soft pliable polymeric material such as olefin that is bondable to fitting member or preform 104 (FIGS. 30 and 31) in substitution for the gasket preform member 106 of FIG. 32. Gasket preform member 206 comprises an annular body or ring 220 provided on opposing lateral faces 252 and 254 with annular beads or ribs 222 and 224. Disposed within a center opening 226 of gasket 206 and coextensive with the opening is a diaphragm 228 in the form of a web of soft impermeable polymeric material, particularly olefin, heat bonded around its periphery to body or ring 220. Diaphragm 228 is disposed to one side of gasket 206, so that an outer surface 250 is substantially coplanar with lateral face or major surface 252 of ring 220. This offset of diaphragm 228 from a center plane of gasket 206 ensures a positive marriage between the diaphragm and a sanitary gauge, e.g., 132 (FIG. 33), eliminating a gap or space that would otherwise fill with air.

Figure 38:
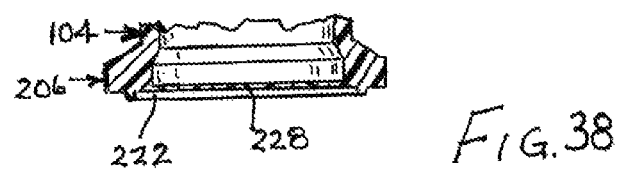
FIG. 38 is partial view of a composite fitting or connector manufactured from the fitting member of FIGS. 30 and 31 and the gasket of FIG. 37.

Like gasket 106, gasket 206 is heat fused to fitting member 104 so as to form a fluid-tight seal between material of the gasket and material of the fitting member, as shown in FIG. 38. Gasket 206 may be provided with an annular nipple 256 projecting from the apex of annular bead or rib 224. Nipple 256 melts quickly at the commencement of a heat fusing procedure to form a thin film between bead or rib 224 and an annular groove 258 provided in end 116 of a lateral or stem 118 of the T fitting 104 (see FIG. 30). The film enhances contact between gasket 206 and the fitting (e.g., T fitting 104), particularly between bead or rib 224 and groove 258. The film also promotes heat fusion of the two elements.

Care must be taken during the heat fusion process to restrict the heat application to the ring bodies 120, 220 so that the diaphragms 128, 228 are insulated from the heat energy. Otherwise the diaphragms can warp and distort. An insulation shield (not shown) may be positioned around the diaphragms 128, 228 during the heat fusion procedure.

Although the invention has been described in terms of particular embodiments and applications, one of ordinary skill in the art, in light of this teaching, can generate additional embodiments and modifications without departing from the spirit of or exceeding the scope of the claimed invention. For instance, the gasket preform (e.g., 36) used to form a composite fitting or connector member pursuant to the present invention may have any suitable configuration of body, flange and projecting elements. The side of the gasket that faces away from the fitting member may have a plurality of pegs or lugs. Likewise the fitting or connector may be provided with any suitable geometry. The fitting member or preform and the gasket preform may be provided with any surface configuration at the surface or sides that are placed into contact as that surface configuration is consumed or reshaped inside the fused joint. Projections may serve a temporary function during manufacture of facilitating registration or alignment of the gasket preform and the fitting preform. Accordingly, it is to be understood that the drawings and descriptions herein are proffered by way of example to facilitate comprehension of the invention and should not be construed to limit the scope thereof.

What is claimed is:

1. A method of manufacturing a fitting or connector for use in constructing a tubing assembly, comprising:
    providing a fitting member including a plurality of ends with respective openings that communicate with one another via a lumen of said connector member, one of said ends being formed with an end face;
    providing a gasket, said gasket being made of a first polymeric material and said fitting member being made of a second polymeric material different from said first polymeric material, said gasket including a first major surface and a second major surface opposed to one another, said gasket further including a diaphragm disposed to one side of said gasket and having a surface substantially coplanar with said second major surface;
    disposing said first major surface of said gasket against said end face; and
    bonding said gasket to said end face of said fitting member to form a fluid-tight seal between said gasket and said end face of said fitting member,
    the bonding of said gasket to said end face of said fitting member including applying heat energy to both said gasket and said fitting member to cause localized melting together of said first polymeric material and said second polymeric material at said end face to heat fuse said gasket to said end face.

2. A method of manufacturing a fitting or connector for use in constructing a tubing assembly, comprising:
    providing a fitting member including a plurality of ends with respective openings that communicate with one another via a lumen of said connector member, one of said ends being formed with an end face;
    providing a gasket, said gasket being made of a first polymeric material and said fitting member being made of a second polymeric material different from said first polymeric material;
    disposing said gasket against said end face; and
    bonding said gasket to said end face of said fitting member to form a fluid-tight seal between said gasket and said end face of said fitting member,
    the bonding of said gasket to said end face of said fitting member including applying heat energy to both said gasket and said fitting member to cause localized melting together of said first polymeric material and said second polymeric material at said end face to heat fuse said gasket to said end face,
    wherein the applying of heat energy to said gasket and said fitting member includes applying heat energy to both said gasket and said fitting member in an amount to induce a mixing of said first polymeric material with said second polymeric material at an interface between said end face and said gasket to produce a density or concentration gradient of said first polymeric material and an oppositely directed density or concentration gradient of said second polymeric material between said gasket and said fitting member, and
    wherein said end face is provided with a recess, said gasket including a first major surface and a second major surface opposed to one another, said first major surface including a projection, the disposing of said gasket against said end face including disposing said projection in said recess.

3. A fitting or connector assembly for use in constructing a tubing assembly, comprising:
    a fitting member including a plurality of ends with respective openings that communicate with one another via a lumen of said connector member,
    said fitting member being provided at one of said ends with a gasket bonded to said fitting member so as to form a fluid-tight seal between material of said gasket and material of said fitting member,
    said gasket including a fluid-impermeable diaphragm at least coextensive with a central opening of said gasket, whereby said gasket provides a seal and impediment to fluid flow through an opening at said one of said ends; and
    a gauge or measurement device coupled to said fitting member at said one of said ends so that said gasket and said diaphragm isolate said gauge or measurement device from fluid flow in said fitting member,
    wherein said gasket is made of a first polymeric material and said fitting member is made of a second polymeric material different from said first polymeric material, said gasket being heat fused to said fitting member, said first polymeric material being mixed with said second polymeric material at an interface between said fitting member and said gasket to produce a density or concentration gradient of said first polymeric material and an oppositely directed density or concentration gradient of said second polymeric material between said gasket and said fitting member.

4. A fitting or connector assembly for use in constructing a tubing assembly, comprising:
    a fitting member including a plurality of ends with respective openings that communicate with one another via a lumen of said connector member,
    said fitting member being provided at one of said ends with a gasket bonded to said fitting member so as to form a fluid-tight seal between material of said gasket and material of said fitting member,
    said gasket including a fluid-impermeable diaphragm at least coextensive with a central opening of said gasket, whereby said gasket provides a seal and impediment to fluid flow through an opening at said one of said ends; and
    a gauge or measurement device coupled to said fitting member at said one of said ends so that said gasket and said diaphragm isolate said gauge or measurement device from fluid flow in said fitting member,
wherein said gasket includes a major surface on a side opposite said fitting, said major surface including an annular rib or bead which is receivable in an annular groove in an additional fitting member.

5. A fitting or connector assembly for use in constructing a tubing assembly, comprising:
a fitting member including a plurality of ends with respective openings that communicate with one another via a lumen of said connector member,
said fitting member being provided at one of said ends with a gasket bonded to said fitting member so as to form a fluid-tight seal between material of said gasket and material of said fitting member,
said gasket including a fluid-impermeable diaphragm at least coextensive with a central opening of said gasket, whereby said gasket provides a seal and impediment to fluid flow through an opening at said one of said ends; and
a gauge or measurement device coupled to said fitting member at said one of said ends so that said gasket and said diaphragm isolate said gauge or measurement device from fluid flow in said fitting member,
wherein said gasket is heat fused to said fitting member through localized heating of said gasket and said fitting member.

6. A fitting or connector assembly for use in constructing a tubing assembly, comprising:
a fitting member including a plurality of ends with respective openings that communicate with one another via a lumen of said connector member,
said fitting member being provided at one of said ends with a gasket bonded to said fitting member so as to form a fluid-tight seal between material of said gasket and material of said fitting member,
said gasket including a fluid-impermeable diaphragm at least coextensive with a central opening of said gasket, whereby said gasket provides a seal and impediment to fluid flow through an opening at said one of said ends; and
a gauge or measurement device coupled to said fitting member at said one of said ends so that said gasket and said diaphragm isolate said gauge or measurement device from fluid flow in said fitting member,
wherein said fitting member is a T fitting having two end openings defining a flow-through pathway and a third end opening laterally of said flow-through pathway, said one of said ends exhibiting said third end opening, said third end opening being closed off or sealed by said gasket including said diaphragm.

7. A method of constructing a connector and tubing assembly, comprising:
providing a fitting or connector member including a plurality of ends with respective openings that communicate with one another through a lumen of said fitting or connector member, said fitting or connector member being provided at one of said ends with a gasket bonded to said fitting or connector member so as to form a fluid-tight seal between material of said gasket and material of said fitting or connector member, said gasket being provided with a liquid-impermeable diaphragm preventing fluid flow through said one of said ends;
providing a gauge or measurement device;
juxtaposing said fitting or connector member and said gauge or measurement device so that an access port of said gauge or measurement device is in contact with said gasket; and
coupling said fitting or connector member and said gauge or measurement device to one another to form a fluid tight seal between said access port and said gasket so that said gasket and said liquid-impermeable diaphragm isolate said gauge or measurement device from direct contact with fluid flowing in said fitting or connector member during use thereof and so that said gauge or measurement device is operative to measure a physical parameter of the fluid,
wherein said gasket is made of a first polymeric material and said fitting or connector member is made of a second polymeric material different from said first polymeric material, said gasket being heat fused to said fitting or connector member so that said first polymeric material is mixed with said second polymeric material at an interface between said fitting or connector member and said gasket to produce a density or concentration gradient of said first polymeric material and an oppositely directed density or concentration gradient of said second polymeric material between said gasket and said fitting or connector member.

8. The method defined in claim 7 wherein the coupling of said fitting or connector member and said gauge or measurement device is removable or releasable, thereby enabling re-use of said gauge or measurement device without sterilization of said gauge or measurement device.

9. The method defined in claim 7, further comprising:
flowing fluid through a tubing circuit including said fitting or connector member, said gasket and said liquid-impermeable diaphragm remaining imperforate and intact during the flowing of fluid through said tubing circuit to isolate said gauge or measurement device from direct contact with the flowing fluid; and
during the flowing of fluid in said tubing circuit including said fitting or connector member, operating said gauge or measurement device to measure a physical parameter of the flowing fluid.

10. A method of constructing a connector and tubing assembly, comprising:
providing a fitting or connector member including a plurality of ends with respective openings that communicate with one another through a lumen of said fitting or connector member, said fitting or connector member being provided at one of said ends with a gasket bonded to said fitting or connector member so as to form a fluid-tight seal between material of said gasket and material of said fitting or connector member, said gasket being provided with a liquid-impermeable diaphragm preventing fluid flow through said one of said ends;
providing a gauge or measurement device;
juxtaposing said fitting or connector member and said gauge or measurement device so that an access port of said gauge or measurement device is in contact with said gasket; and
coupling said fitting or connector member and said gauge or measurement device to one another to form a fluid tight seal between said access port and said gasket so that said gasket and said liquid-impermeable diaphragm isolate said gauge or measurement device from direct contact with fluid flowing in said fitting or connector member during use thereof and so that said gauge or measurement device is operative to measure a physical parameter of the fluid, wherein the coupling of said fitting or connector member and said gauge or measurement device to one another includes placing a clamp about juxtaposed ends of said fitting or connector member and said gauge or measurement device and locking said clamping about said juxtaposed ends of said fitting or connector member and said gauge or measurement device.

\* \* \* \* \*

UNITED STATES PATENT AND TRADEMARK OFFICE
CERTIFICATE OF CORRECTION

Page 1 of 1

PATENT NO. : 11,143,336 B1
APPLICATION NO. : 16/189351
DATED : October 12, 2021
INVENTOR(S) : Paul Robert DuPont, Jr., Christopher R. Ray and John A. Capra It is certified that error appears in the above-identified patent and that said Letters Patent is hereby corrected as shown below:

In the Claims

Column 11; Claim 1; Lines 31-34:
providing a fitting member including a plurality of ends with respective openings that communicate with one another via a lumen of said connector member, one of said ends being formed with an end face;

Should read:
providing a fitting member including a plurality of ends with respective openings that communicate with one another via a lumen of said fitting member, one of said ends being formed with an end face;

Column 11; Claim 2; Lines 36-39:
providing a fitting member including a plurality of ends with respective openings that communicate with one another via a lumen of said connector member, one of said ends being formed with an end face;

Should read:
providing a fitting member including a plurality of ends with respective openings that communicate with one another via a lumen of said fitting member, one of said ends being formed with an end face;

Column 12; Claim 3; Lines 25-27:
a fitting member including a plurality of ends with respective openings that communicate with one another via a lumen of said connector member, Should read:
a fitting member including a plurality of ends with respective openings that communicate with one another via a lumen of said fitting member, Signed and Sealed this
Seventh Day of December, 2021

Drew Hirshfeld
*Performing the Functions and Duties of the
Under Secretary of Commerce for Intellectual Property and
Director of the United States Patent and Trademark Office*